United States Patent
Shimizu et al.

[11] Patent Number: 5,119,492
[45] Date of Patent: Jun. 2, 1992

[54] INFORMATION RETRIEVAL APPARATUS WITH SEPARATE RETRIEVAL CONDITIONS AND UPDATABLE KEY REGISTERS

[75] Inventors: Naohiko Shimizu; Isao Nakai, both of Hadano, Japan

[73] Assignee: Hitachi, Ltd., Tokyo, Japan

[21] Appl. No.: 193,807

[22] Filed: May 13, 1988

[30] Foreign Application Priority Data

May 15, 1987 [JP] Japan .................. 62-118541

[51] Int. Cl.⁵ .............................................. G06F 15/40
[52] U.S. Cl. ................................. 395/600; 364/282.1; 364/252.4
[58] Field of Search ... 364/200 MS File, 900 MS File

[56] References Cited

U.S. PATENT DOCUMENTS 4,451,901 5/1984 Wolfe et al. .................. 364/900
4,554,631 11/1985 Reddington .................. 364/300
4,805,099 2/1989 Huber .......................... 364/200
4,817,050 3/1989 Komatsu et al. ............... 364/518

Primary Examiner—Lawrence E. Anderson
Attorney, Agent, or Firm—Fay, Sharpe, Beall, Fagan, Minnich & McKee

[57] ABSTRACT

In an information retrieval apparatus having a data register, a plurality of first key registers, a second key register and a comparator for comparing the content of the data register and the content of one of the key registers and producing a comparison result signal for use of the information retrieval, separate retrieval conditions are established for a number of information data constituting records, and the first key registers store different ones of the retrieval conditions and a second key register stores the remaining ones of the retrieval conditions one after another in such a manner that the second key register is updated every time when a new retrieval condition is stored therein.

1 Claim, 5 Drawing Sheets

INFORMATION RETRIEVAL APPARATUS WITH SEPARATE RETRIEVAL CONDITIONS AND UPDATABLE KEY REGISTERS

BACKGROUND OF THE INVENTION

The present invention relates to an information retrieval technology, and in particular, to a technology suitably applicable to a job which, depending on a combination of retrieval conditions respectively established in an independent fashion for a plurality of columns constituting a record, extracts an objective record from a group of records.

As a so-called data base, there has been known a relational data base comprising a group of records in which the length of a plurality of columns constituting each record and the information arrange positions in the pertinent records are standardized or predetermined among the respective records of the group.

In this kind of the relational data base, as a method to extract an objective record depending on a combination of retrieval conditions independently applied to a plurality of columns constituting each record, there has been known a method described, for example, in the JP-A-58-139273 laid open on Aug. 18, 1983 (corresponding to U.S. Ser. No. 341,530 now U.S. Pat. No. 4,451,901 filed on Jan. 21, 1982).

The above-mentioned known method is summarized as follows: namely, in a case of a record extraction request depending on a combination of a plurality of retrieval conditions (queries), the system drives as many query processors as there are queries for the retrieval so as to accomplish the data retrieval processing.

However, the maximum number of retrieval conditions (queries) has heretofore been restricted by the number of the query processors, which leads to a problem that an increase of the retrieval conditions cannot be readily coped with.

SUMMARY OF THE INVENTION

It is therefore an object of the present invention to provide an information retrieval apparatus and an information retrieval method capable of easily coping with an increase of the retrieval conditions.

Another object of the present invention is to provide an information retrieval apparatus and an information retrieval method capable of increasing the retrieval speed.

According to an aspect of the present invention, there is provided an information retrieval apparatus which extracts a record having at least one column from a group of records based on at least one retrieval condition independently established for each column, wherein there is disposed retrieval means including first and second key registers each for respectively storing at least one retrieval condition such that in a case where the number of the retrieval conditions exceeds the total number of the first and second key registers, a portion of the retrieval conditions is fixedly located or is set to be resident in the first key registers and the remaining portion of the retrieval conditions is stored in the second key register through a sequential update operation, thereby enabling a retrieval operation for collating at least one retrieval condition stored in the first and second key registers with said at least one column to be continued.

According to the constitution described above, even when the number of the retrieval conditions exceeds the total number of the first and second key registers, the retrieval conditions in excess of the number of the first key register are appropriately loaded if necessary in the second key registers so as to sequentially update the content of the second key register to attain an objective retrieval condition, thereby enabling the retrieval operation to be continuously effected. Consequently, the retrieval operation is not restricted by the hardware or the like and hence can readily cope with on increase of the retrieval conditions.

Furthermore, due to the retrieval conditions resident in the first key registers, the pertinent retrieval conditions need not be read out from a working memory or the like each time a retrieval is achieved; consequently, a period of time required to effect an access to the working memory is minimized and the retrieval speed is increased.

Moreover, according to another aspect of the present invention, there is provided an information retrieval apparatus in which separate retrieval conditions are established for retrieving records each including a number of information data. the apparatus comprising control means and retrieval means coupled to the control means, in which the retrieval means includes: a first register for storing therein the number of information data one after another under control of the control means in such a manner that one of the information data is stored in the first register; a plurality of second registers each for storing therein a different one of the separate retrieval conditions under control of the control means; a third register for storing therein the remaining ones of the separate retrieval conditions one after another under control of the control means in such a manner that a retrieval condition stored in the third register is replaced by the next coming retrieval condition; and a comparator for comparing, under control of the control means, the content of the first register with those of the second registers and with that of the third register sequentially so that all of the separate retrieval conditions are applied to their associated information data and generating, under control of the control means, a comparison result signal.

DESCRIPTION OF THE PREFERRED EMBODIMENTS

Figure 1:
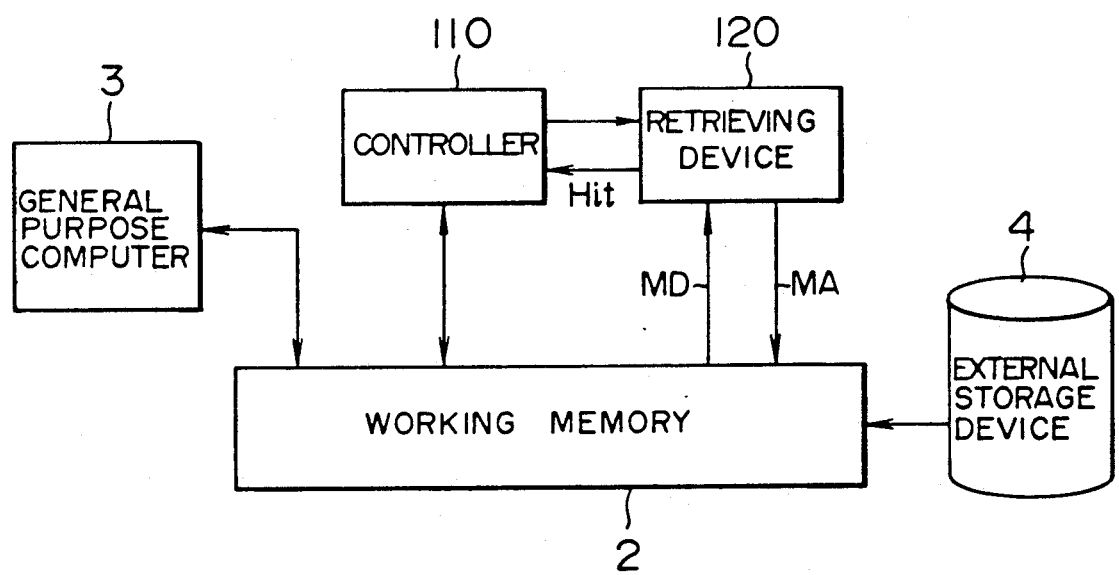
FIG. 1 is a block diagram schematically showing a system including an information retrieval apparatus according to an embodiment of the present invention.
Figure 2:
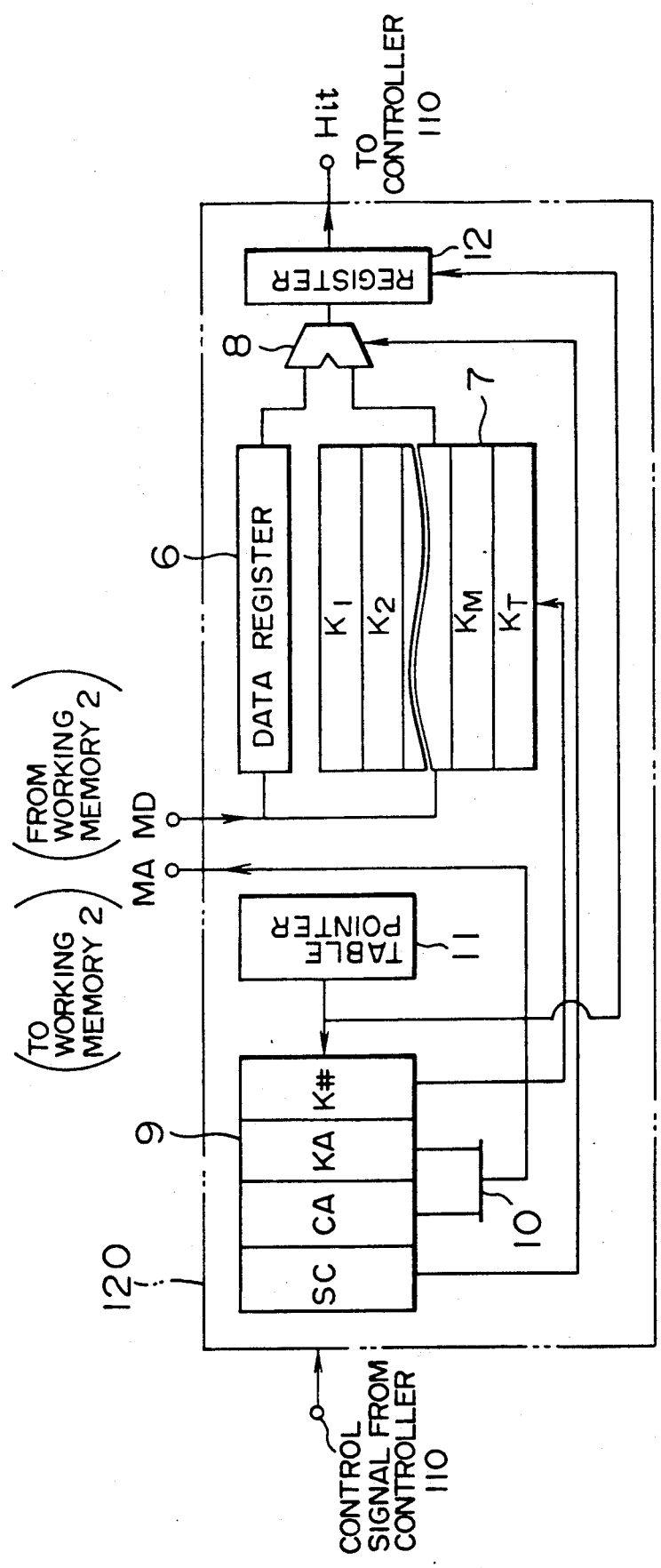
FIG. 2 is a schematic diagram showing a configuration example of a retrieving device which can be employed in the information retrieval apparatus of FIG. 1.

Referring to FIGS. 1 and 2, the information retrieval apparatus as an embodiment of the present invention includes a controller 110 having a microprocessor such as, for example, a 16-bit microprocessor, a retrieving device 120, and a working memory 2. The working memory 2 is connected to a general-purpose computer 3 and an external storage device 4.

Figure 3:
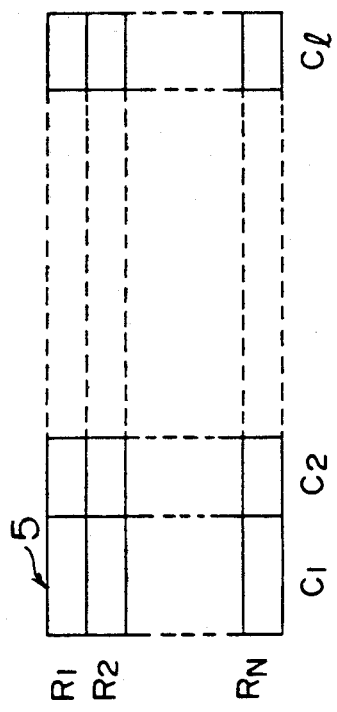
FIG. 3 is a diagram illustrating a column configuration of a record as an example of a retrieval object.

The external storage device 4 contains, as shown in FIG. 3, a group of records 5 constituted with a plurality of records $R_1, R_2, \ldots, R_N$ each including a plurality of predetermined-length (or variable-length) columns $C_1, C_2, \ldots, C_l$, thereby forming a relational data base.

The general-purpose computer 3 supplies the working memory 2 with instructions associated with retrieval conditions and retrieval ranges for a plurality of records $R_1, R_2, \ldots, R_N$ stored in the external storage device 4. The controller 110 reads an instruction on a retrieval range from the working memory 2 and then reads out, on the basis of the retrieval range instructions, a plurality of records corresponding to the retrieval range from the external storage device 4. As a result, the plural records as the retrieval object and retrieval conditions to be applied thereto are stored in the working memory 2.

The retrieving device 120 includes, as shown in FIG. 2, a data register 6 sequentially storing therein information data of retrieval objective columns $CS_1, CS_2, \ldots, CS_s$ s read out from the working memory 2 under control of the controller 110 as a result of an application of the retrieval conditions to a plurality of columns $C_1, C_2, \ldots, C_l$ constituting each record and a plurality of key registers 7 respectively storing a plurality of retrieval conditions loaded in the working memory 2 under control of the controller 110.

The key registers 7 include M resident key registers $K_1, K_2, \ldots, K_M$ (first key registers) in which a plurality of retrieval conditions read out from the working memory 2 are stored as resident data and a non-resident key register $K_T$ (second key register) which is appropriately updated when required with a retrieval conditions read from the working memory 2.

The data register 6 and the plural key registers 7 are connected to a comparator 8 so as to form a configuration such that the information data stored in the data register 6 is collated or compared with data of retrieval conditions stored in the resident key registers $K_1, K_2, \ldots, K_M$ or the non-resident key register $K_T$ constituting the plural key registers 7 depending on a predetermined condition, for example, the condition represented as "greater than", "less than", or "equal to". A comparison result output from the comparator 8 is stored in a location or an area indicated by a table pointer 11.

Furthermore, the retrieving device 120 includes a retrieval control table 9 holding information as to the natures or kinds SC (denoting the condition of greater than, less than, or equal to, for example) of plural retrieval conditions to be sequentially sent to the comparator 8, information as to plural column addresses CA, namely, addresses of columns in the working memory 2 to which columns retrieval conditions are to be applied, key addresses KA, namely, addresses of predetermined retrieval conditions in the working memory 2 which retrieval conditions are to be read from the working memory 2 for storage in the key registers 7, and information as to key register numbers K# specifying numbers for key registers 7 in which the retrieval conditions read out by the use of the key addresses KA are to be stored.

Transmission of one column address CA and one key address KA as an address signal MA of the working memory 2 is changed over by a selector 10 under control of the controller 110 such that the data of the pertinent column or the key of the retrieval condition is read out as a data signal MD. The table pointer 11 is indicative of the order of transmission of the column data and the retrieval condition data to be read out.

Next, a description will be given of the operation according to the embodiment.

Figure 4A:
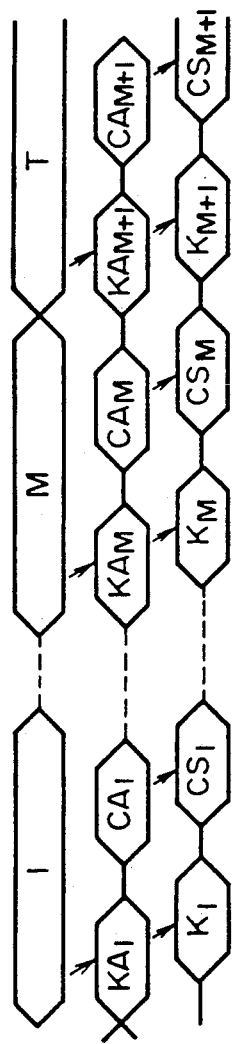
FIGS. 4a and 4b are timing charts for explaining the operation of the information retrieval according to an embodiment of the present invention.
Figure 4B:
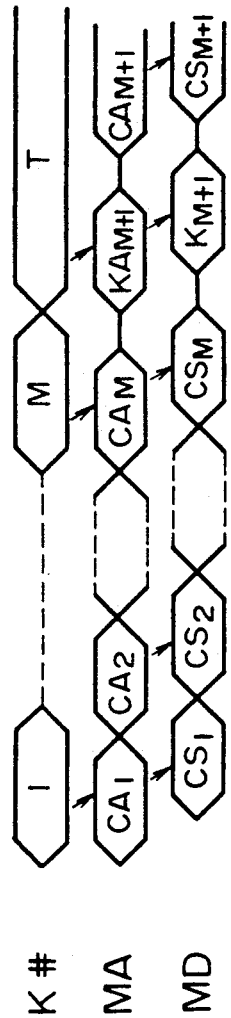
Figure 5A:
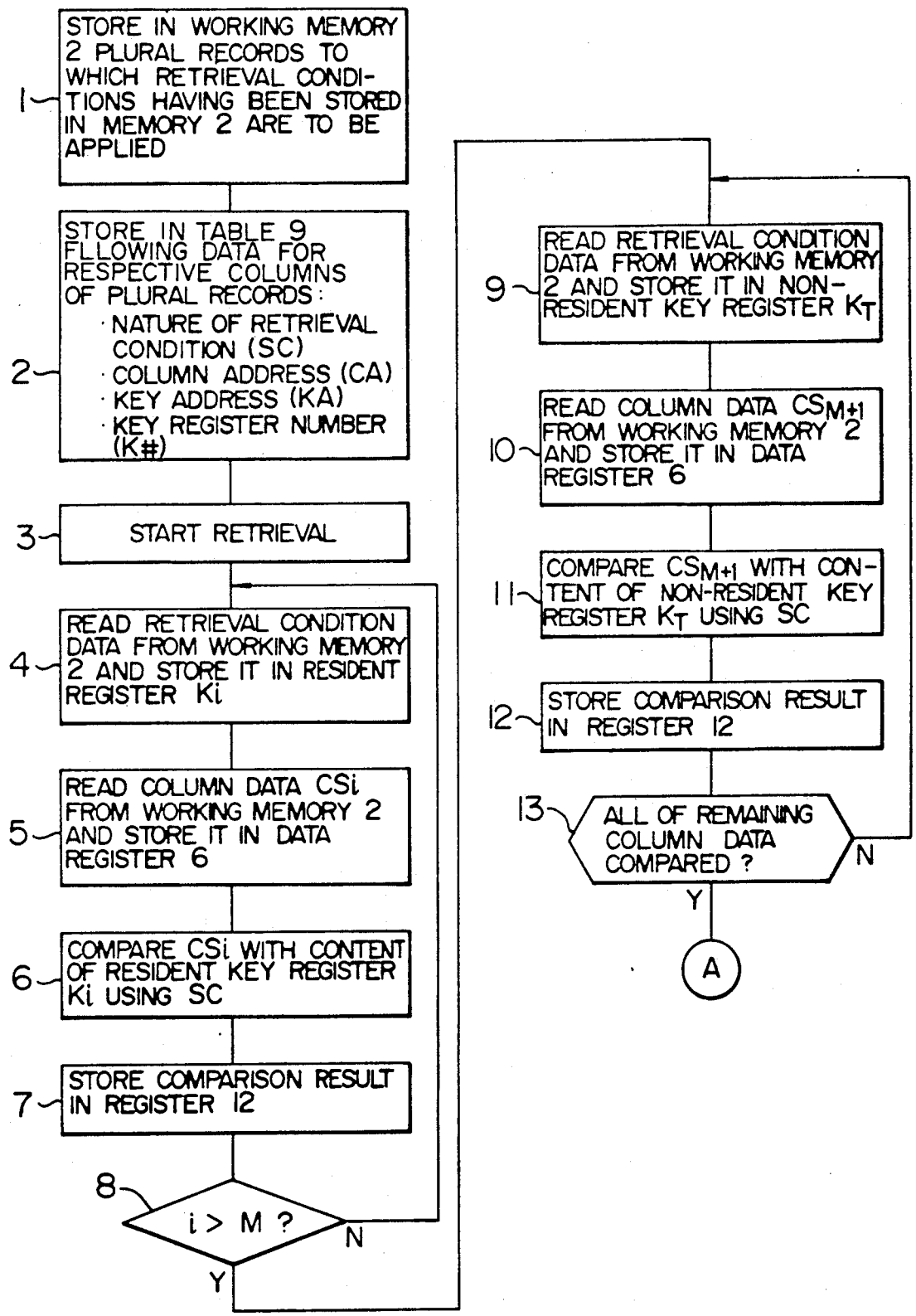
FIGS. 5a and 5b are flow charts showing retrieval steps according to an embodiment of the present invention.
Figure 5B:
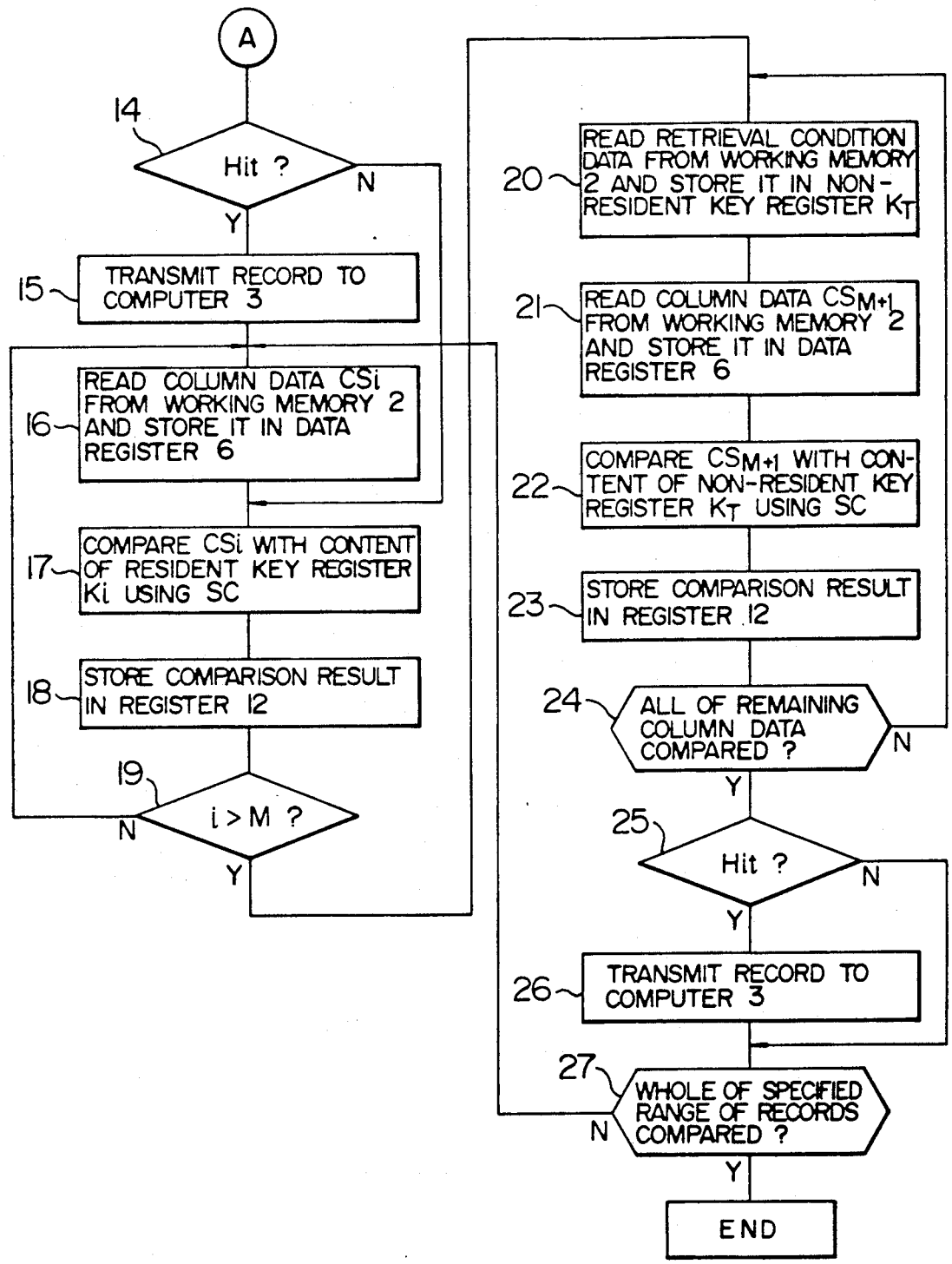

FIGS. 4a and 4b and FIGS. 5a and 5b are timing charts and flow charts for explaining the operation of the information retrieval apparatus of the embodiment and show a retrieval processing of the first record and a retrieval processing of the second record, respectively. FIGS. 4a and 5a are related to a retrieval in a first record, while FIGS. 4b and 5b are related to a retrieval in a second (or any subsequent) record.

After plural records are stored in the working memory 2 (step 1) as described above, the retrieval control table 9 of the retrieving device 120 is loaded under control of the controller 110 with information as to one or more natures or kinds SC, information as to one or more column addresses CA, information as to one or more key addresses KA, and information as to one or more key register numbers K# for retrieval conditions to be applied to the retrieval objective columns $CS_1, CS_2, \ldots$ and $CS_s$ (step 2). Information as to one set of SC, CA, KA and K# designated by the table pointer 11 is read out from the retrieval control table 9 at a time by the controller 110.

Now a retrieval start is instructed from the controller 110 to the retrieving device 120 (step 3). A retrieval is first made in a first record $R_1$. The selector 10 associated with the retrieval control table 9 first selects the key address KA so as to output the data as an address signal MA of the working memory 2, and a key register K (K#) is selected from the key registers 7 based on the key register number K# read out at the same time; thereafter, the key register K (K#) is loaded with a retrieval condition data to be used as a key of the retrieval operation, the data read from the working memory 2 as an information signal MD (step 4).

The selector 10 then selects the column address CA, which in turn is sent as an address signal MA to the working memory 2, with a result that the data of the retrieval objective column $CS_1$ is read as a data signal MD from the working memory 2 and is set to the data register 6 (step 5).

Furthermore, the comparator 8 is loaded with the nature (kind) SC of the retrieval condition such as a condition represented as "greater than", "less than", or "equal to" which is employed when a collation or comparison is accomplished between the information data of the retrieval objective column set to the data register 6 and the retrieval condition data set to the key register K (K#), and then the data of the retrieval objective column is collated with the retrieval condition data for a decision (step 6). The comparison result signal is stored in the register 12 corresponding to a value designated by the table pointer 11 (step 7).

The operation above is repeatedly achieved for each retrieval objective column when the data thereof is in sequence inputted to the data register 6, with the table pointer 11 being incremented, so that, as shown in FIG. 4a, the retrieval condition data items corresponding to the maximum M retrieval objective columns $CS_1, CS_2, \ldots$ and $CS_M$ associated with the resident key registers $K_1, K_2, \ldots, K_M$ are sequentially stored in the resident key registers $K_1, K_2, \ldots, K_M$ and that the retrieval condition data corresponding to the retrieval objective columns $CS_{M+1}, \ldots, CS_s$ exceeding (step 8) the capacity of the resident key registers of which the number is represented as M is assigned to the non-resident key register $K_T$ by assuming the key register number K# to be "T", thereby continuing the collating operation while sequentially updating the preceding retrieval condition data (steps 9-13). Further, the comparison results from the comparator 8 for each record with respect to the retrieval objective columns $CS_1$, $CS_2$, . . . and $CS_s$ are evaluated in a cumulative fashion by the controller 110 for each record stored in the register 12. When a predetermined condition is statisfied, a signal denoting a condition that a record matching with the predetermined retrieval condition is found and records satisfying the retrieval condition are delivered to the general-purpose computer 3 (steps 14-15).

Moreover, in the retrieval operations for the second and subsequent records $R_2$, $R_3$, . . . , since the retrieval condition data corresponding to the retrieval objective columns $CS_1$, $CS_2$, . . . and $CS_M$ have already been inputted to the resident key registers $K_1$, $K_2$, . . . , $K_M$, as shown in FIGS. 4b and 5b, the operation to read out the retrieval condition data from the working memory 2 need not be carried out in the retrieval operation for the retrieval objective columns $CS_1$, $CS_2$, . . . and $CS_M$; and for the collating operation of the retrieval objective columns $CS_{M+1}$, . . . , $CS_s$ exceeding the capacity L of the resident key registers $K_1$, $K_2$, . . . , $K_M$ of which the number is represented as M, on the assumption that the key register number K# is T, the retrieval condition data corresponding to the retrieval objective columns $CS_{M+1}$, . . . , $CS_s$ are inputted to the non-resident key register $K_T$ while sequentially updating the preceding data, thereby continuously effecting the collating operation (steps 16-22).

In addition, the comparison results from the comparator 8 for each record with respect to the retrieval objective columns $CS_1$, $CS_2$, . . . and $CS_s$ are evaluated in a cumulative fashion by the controller 110 for each record stored in the register 12. When a predetermined condition is satisfied, a signal denoting a condition that a record matching with the predetermined retrieval condition is found and records satisfying the retrieval condition are delivered to the general-purpose computer (steps 23-26). Incidentally, an internal memory of the processor included in the controller 110 may be utilized in place of the register 12.

As described above, according to this embodiment, the key registers 7 include M resident key registers $K_1$, $K_2$, . . . , $K_M$ and a single non-resident key register $K_T$, and for retrieval operation of up to M retrieval objective columns $CS_1$, $CS_2$, . . . , $CS_M$, the key data or retrieval condition data stored in the resident key registers $K_1$, $K_2$, . . . , $K_M$ are employed, whereas for the retrieval operation of the retrieval objective columns $CS_{M+1}$, $CS_{M+2}$, . . . , $CS_s$ exceeding the capacity of the resident key registers of which the number is represented as M, the retrieval condition data read from the working memory 2 is sequentially loaded in a non-resident key register $K_T$. As a result, the retrieval operation can be easily accomplished for the retrieval objective columns $CS_1$, $CS_2$, . . . , $CS_s$ of which the number exceeds the total number of the resident key registers $K_1$, $K_2$, . . . , $K_M$ and the non-resident key register $K_T$; consequently, the system can readily cope with an increase in the number of the retrieval objective columns $CS_1$, $CS_2$, . . . , $CS_s$, namely, an increase of the retrieval conditions without causing any restriction with respect to the hardware.

Furthermore, in the retrieval operations for the second and subsequent records, the retrieval condition data need not be read out from the working memory 2 so as to be loaded in the resident key registers $K_1$, $K_2$, . . . . $K_M$; as a consequence, the number of accesses to the working memory 2 is minimized and hence the retrieval speed is increased.

Incidentally, the present invention is not restricted by the embodiment above and is broadly applicable, for example, to a data retrieval method in which a plurality of sets of key registers and a comparator are disposed such that simultaneous retrieval is effected with a plurality of key data items for data of a retrieval objective column inputted to the data register or to a data retrieval method in which a comparator circuit of a cellular array type is subdivided into a plurality of areas for the data retrieval.

We claim:

1. A method of retrieving a record among records in an information retrieval apparatus comprising a first register, a plurality of second registers and a third register, in which each of the records include a plurality of column containing data elements and separate retrieval conditions are established for each of the columns for retrieving records, the method comprising the steps of:

(a) storing a data element of one of said records in said first register;

(b) storing, in one of said second registers, a retrieval condition established for said data elements;

(c) reading out said data element in said first register and said retrieval conditions in said second register;

(d) comparing said data element read form the first register with said retrieval condition;

(e) producing a comparison result signal as a result of step (d);

(f) storing said comparison result signal obtained in step (e);

(g) repeating steps (a) to (f) until all of said second registers have stored retrieval conditions, wherein said first register is updated with a new data element and different retrieval conditions are stored in different second registers;

(h) storing another data element of said one record in said first register in place of the former data element;

(i) storing, in said third register, a retrieval condition established for said data element stored in step (h);

(j) reading out said data element in said first register and said retrieval condition in said third register;

(k) comparing said data element read from the first register with said retrieval condition;

(l) producing a comparison result signal as a result of step (k);

(m) storing said comparison result signal obtained in step (l);

(n) repeating steps (h) to (m) until all of the remaining retrieval conditions have been applied to their associated data element, wherein said third register is updated with a new retrieval condition;

(o) updating said first register to store therein an data element of another record;

(p) reading out said data element in said updated first register and the retrieval condition in one of said second registers;

(q) comparing said data element read from said updated first register with said retrieval condition;

(r) producing a comparison result signal as a result f step (q);

(s) storing said comparison result signal obtained in step (r);
(t) repeating steps (o) to (s) until all of the retrieval conditions have been read from said second registers;
(u) storing another data element of said another record in said first register in place of the former data element;
(v) storing, in said third register, a retrieval condition established for said data element stored in step (u);
(w) reading out said data element in said first register and said retrieval condition in said third register;
(x) comparing said data element read from the first register with said retrieval condition;
(y) producing a comparison result signal as a result of step (x);
(z) storing said comparison result signal obtained in step (y);
(z1) repeating steps (u) to (z) until all of the remaining retrieval conditions have been applied to their associated data element, wherein said third register is updated with a new retrieval condition; and
(z2) extracting records in accordance with said comparison result signals.

* * * * *